(12) United States Patent
Peng

(10) Patent No.: US 6,466,283 B1
(45) Date of Patent: Oct. 15, 2002

(54) METHOD FOR MANUFACTURING ALUMINUM EXTRUDED OUTER FRAME FOR LCD DISPLAY

(76) Inventor: Ching-Lung Peng, 1460, Chung Cheng West Road, Chu Pei City, Hsinchu Hsien (TW)

(*) Notice: Subject to any disclaimer, the term of this patent is extended or adjusted under 35 U.S.C. 154(b) by 0 days.

(21) Appl. No.: 09/988,535

(22) Filed: Nov. 20, 2001

(51) Int. Cl.[7] .............................................. G02F 1/1331
(52) U.S. Cl. ........................................ 349/58; 361/723
(58) Field of Search .................. 349/58, 187; 361/723, 361/724, 730, 732, 535

(56) References Cited

U.S. PATENT DOCUMENTS 4,231,098 A * 10/1980 Tanimoto ..................... 200/5 A
5,450,285 A * 9/1995 Schlemmer ................. 248/615
5,751,544 A * 5/1998 Song ........................... 361/685
6,317,314 B1 * 11/2001 Kung et al. .................. 361/679

* cited by examiner

Primary Examiner—Toan Ton
(74) Attorney, Agent, or Firm—Troxell Law Office PLLC (57) ABSTRACT

A method for manufacturing an aluminum extruded outer frame for LCD display includes the following steps: intrusion and formation of sash portions, diagonal beveling of stiles, stamping process, frame welding and surface polishing and coating. The finished aluminum extruded outer frame of LCD display presents the advantageous features of light weight and outstanding beauty. The LCD display frame made of such aluminum material greatly reduces EMI hazards. Compared with the prior art of LCD frames which are made of plastic material, the aluminum extruded outer frame of LCD display is light-weighted because it does not require reinforcement of metal plates; besides, it is suitable for recycling as the environment protection regulations require.

3 Claims, 9 Drawing Sheets

METHOD FOR MANUFACTURING ALUMINUM EXTRUDED OUTER FRAME FOR LCD DISPLAY

FIELD OF THE INVENTION

The present invention relates to a method for manufacturing an aluminum extruded outer frame for LCD display, which not only presents an economic saving in production cost, but also reduces greatly EMI hazards and complies with the recycling benefit as the environmental protection requires.

BACKGROUND OF THE INVENTION

The prior art of a plastic LCD display frame is a directly intruded product for lower production cost. However, plastic material is hardly disposable, entirely in defiance of the requirement the environmental protection has set out, and numerous derivative ecological problems have thus occurred which require immediate attention and solutions.

For safeguarding from EMI hazards, a plastic LCD outer frame is normally provided with metal partition plates, which are generally made of steel material. In this case, the light weight of a LCD display frame with plastic material is therefore defeated after steel partition plates are added. Nowadays, the peripheral industry is striving in every way to make the product lighter in an effort to enhance its competitive edge.

Viewing the above-mentioned disadvantages the prior art of a plastic LCD display frame presents, the inventor has devoted for years to the improvement in aluminum material to meet the light weight and environmental requirements. For easy manufacturing an aluminum outer frame for LCD display, it usually applies casting method or extruding method. However, a cast manufacturing aluminum frame seems inadequate because of its high production cost and shorter service life as compared with an aluminum extruded frame. In other words, it is easier and more economic to manufacture an aluminum frame by means of extrusion formation, even though it is impossible to extrude a complete square sash in one process, but welding operation will help achieve the purpose. In short, an outer frame for LCD display manufactured in accordance with this invention signifies ample economic, low production cost, immense EMI protection and remarkable recovery for reuse from the scrapped product as the environmental protection sets forth.

The invention is explained in great details with aid of preferable embodiments as illustrated in the drawings attached.

DETAILED DESCRIPTION OF THE INVENTION

Figure 1:
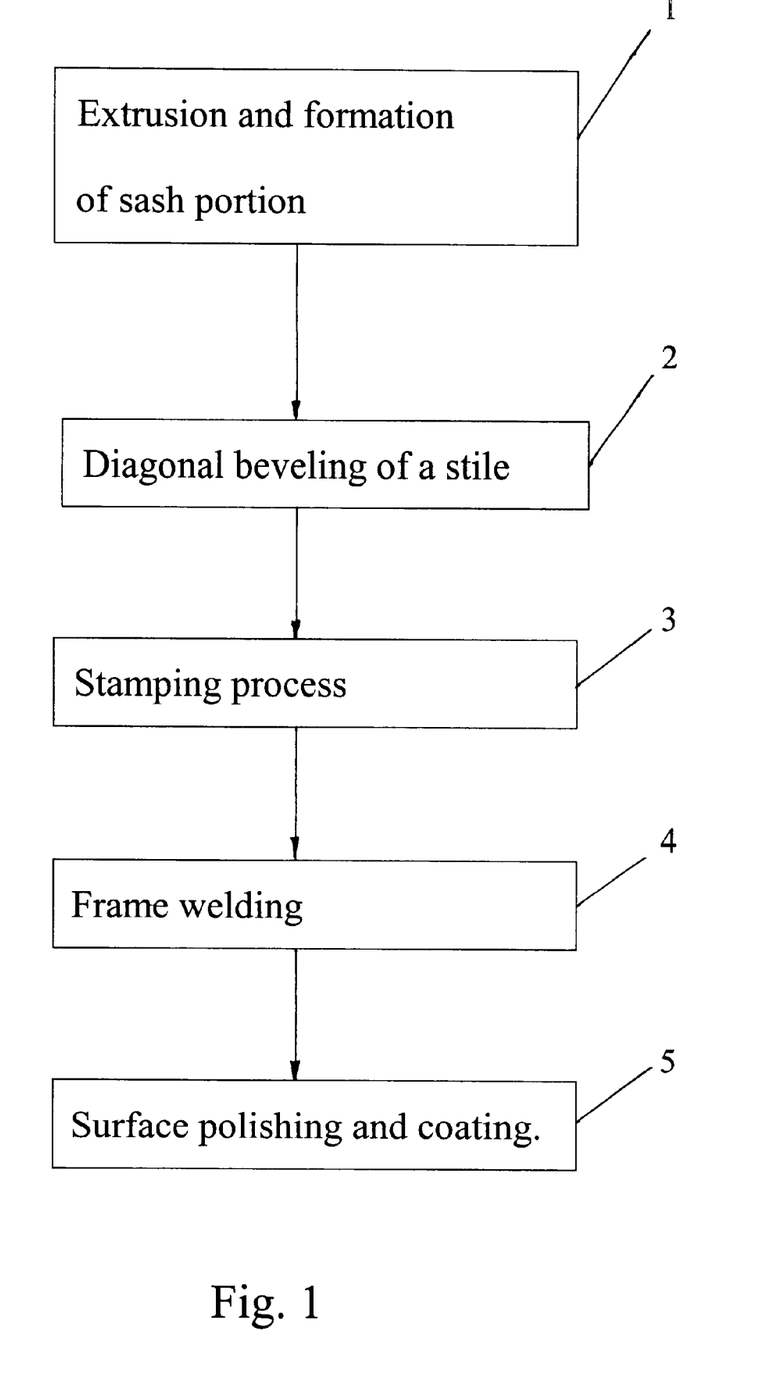
FIG. 1 shows a process flow for manufacturing an aluminum extruded outer frame for LCD display of the invention.
Figure 2:
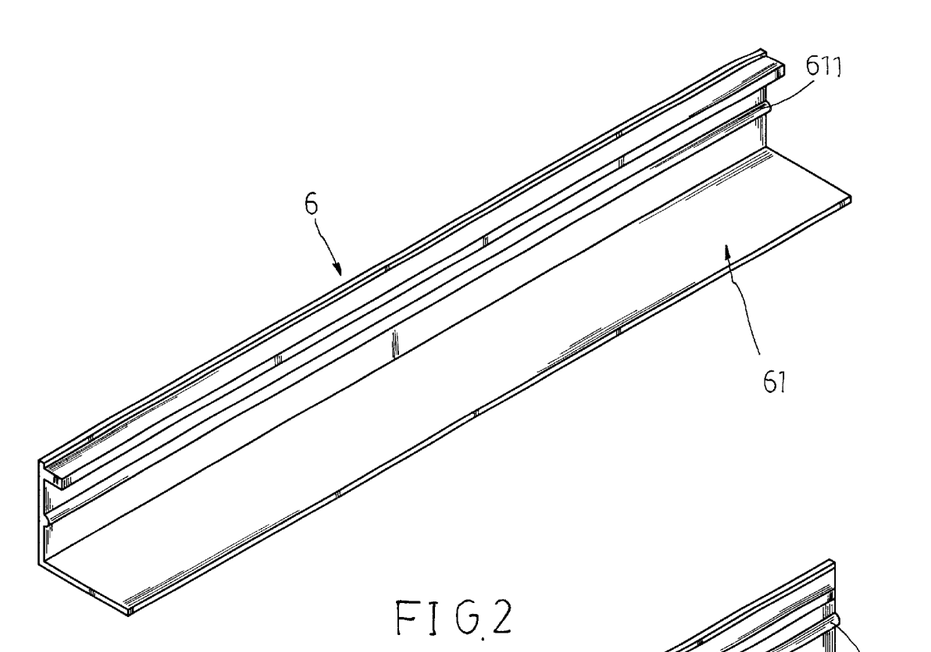
FIG. 2 shows a front stile appearance of the invention.
Figures 4, 5:
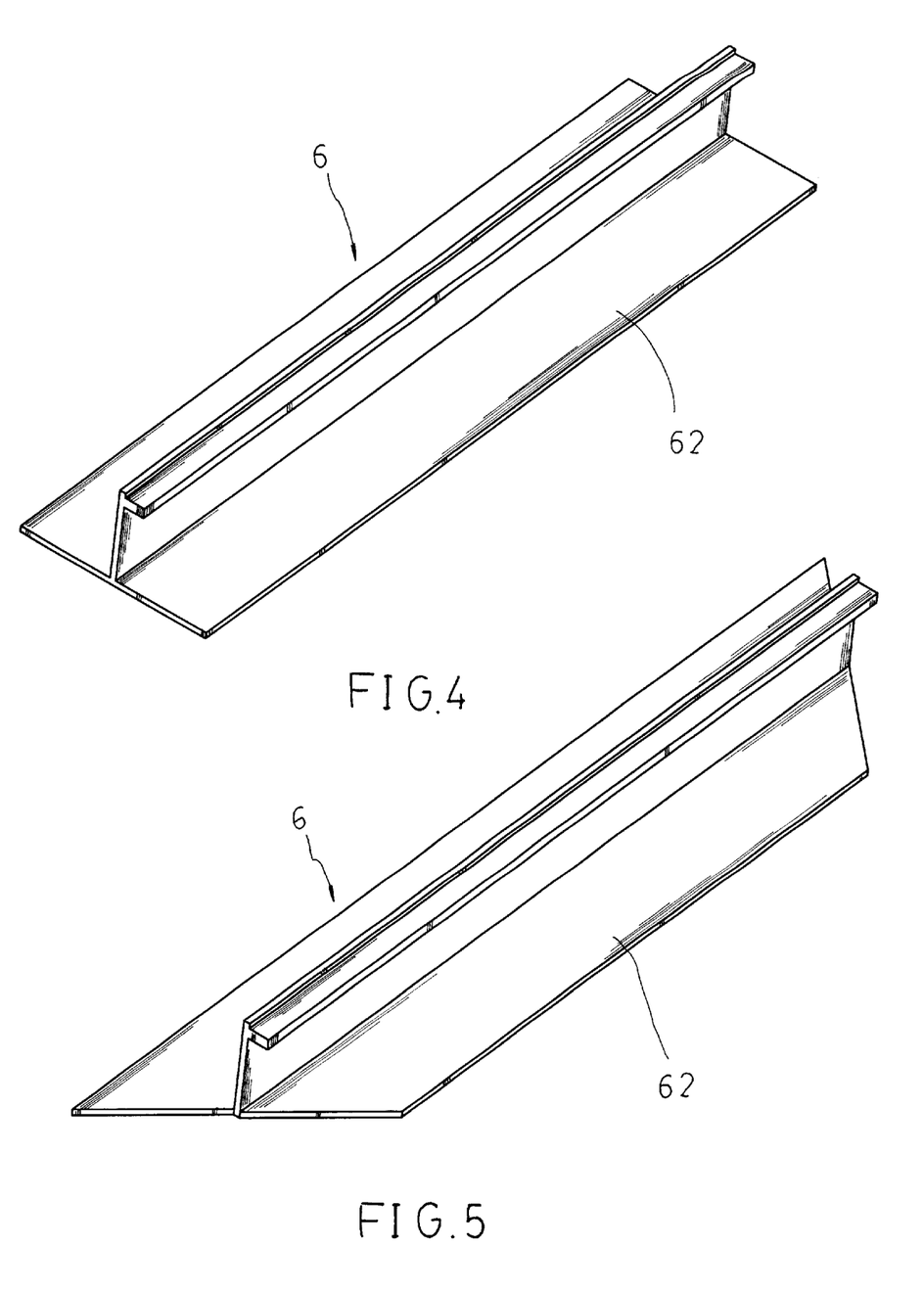
FIG. 4 shows a rear stile appearance of the invention.
FIG. 5 shows a rear stile with corners beveled of the invention.

FIG. 1 shows a process flow of manufacturing an aluminum-extruded outer frame for LCD display, which comprises the following steps:

Step 1—Extrusion and formation of sash portion, in which aluminum material is extruded to form the long sash portion 6 in a form of the front stile 61 as illustrated in FIG. 2, or the rear stile 62 as shown in FIG. 4. The interior of the front stile 61 is provided with the transverse glazing rib 611.

Figure 3:
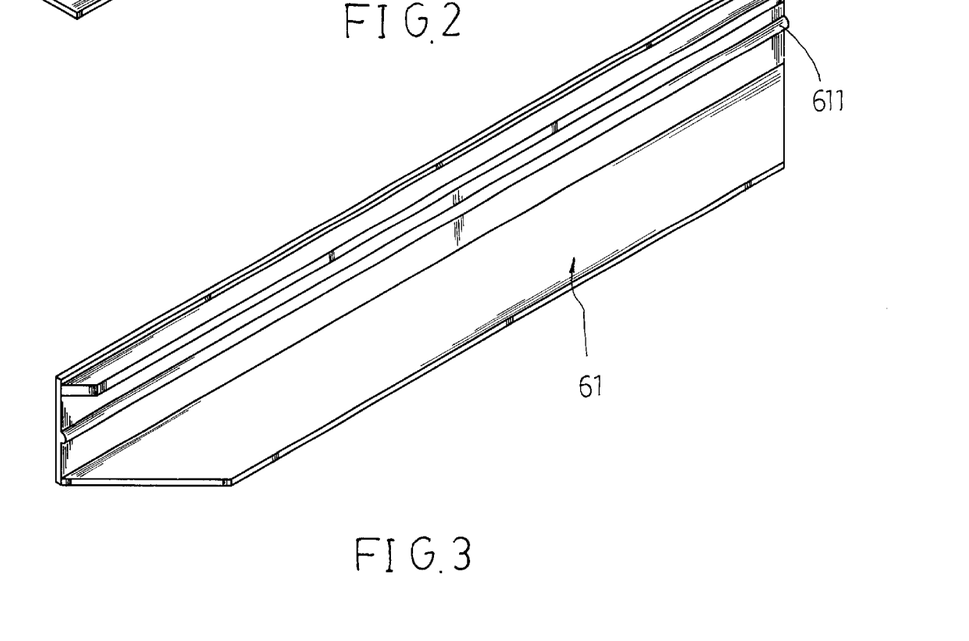
FIG. 3 shows a front stile with corners beveled of the invention.

Step 2—Diagonal beveling of a stile, in which the front stile 61 and the rear stile 62 are placed on a cutting machine to be diagonally beveled as shown in FIGS. 3 and 5.

Figure 6:
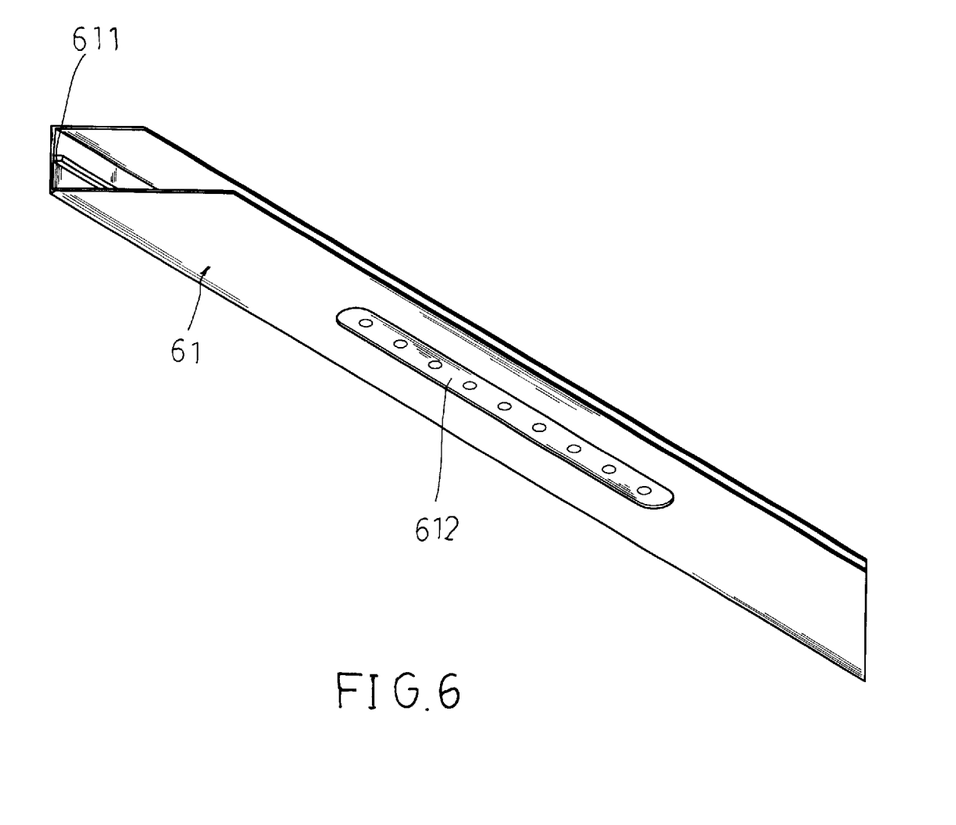
FIG. 6 is a schematic diagram showing a keyboard punched on a front stile.
Figure 8:
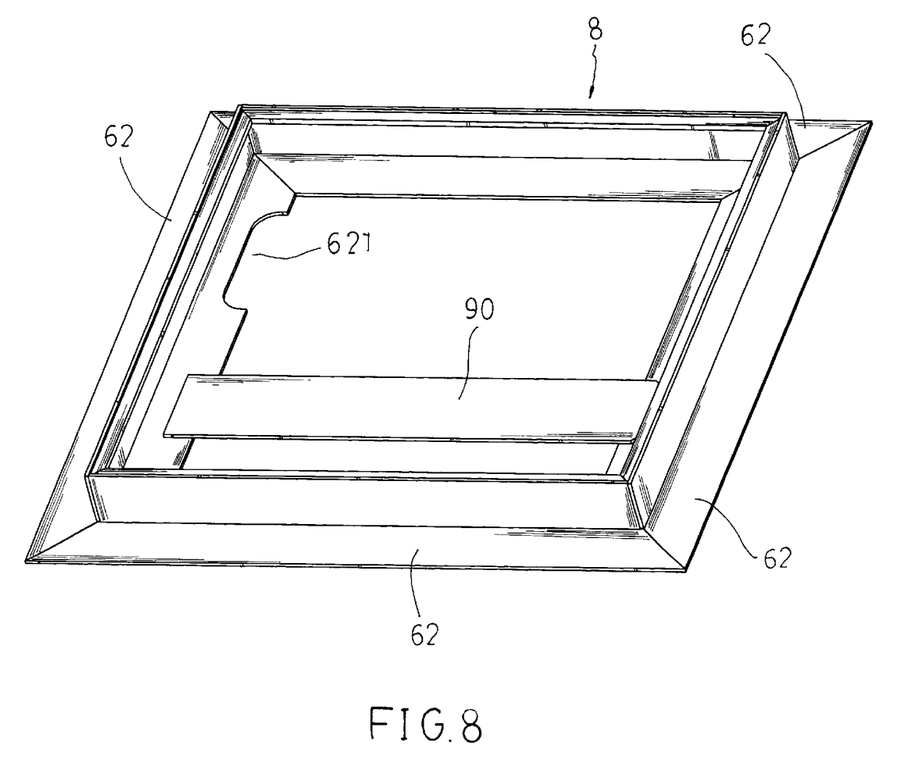
FIG. 8 shows a complete welded rear sash with four pieces of a rear stile.
Figure 9:
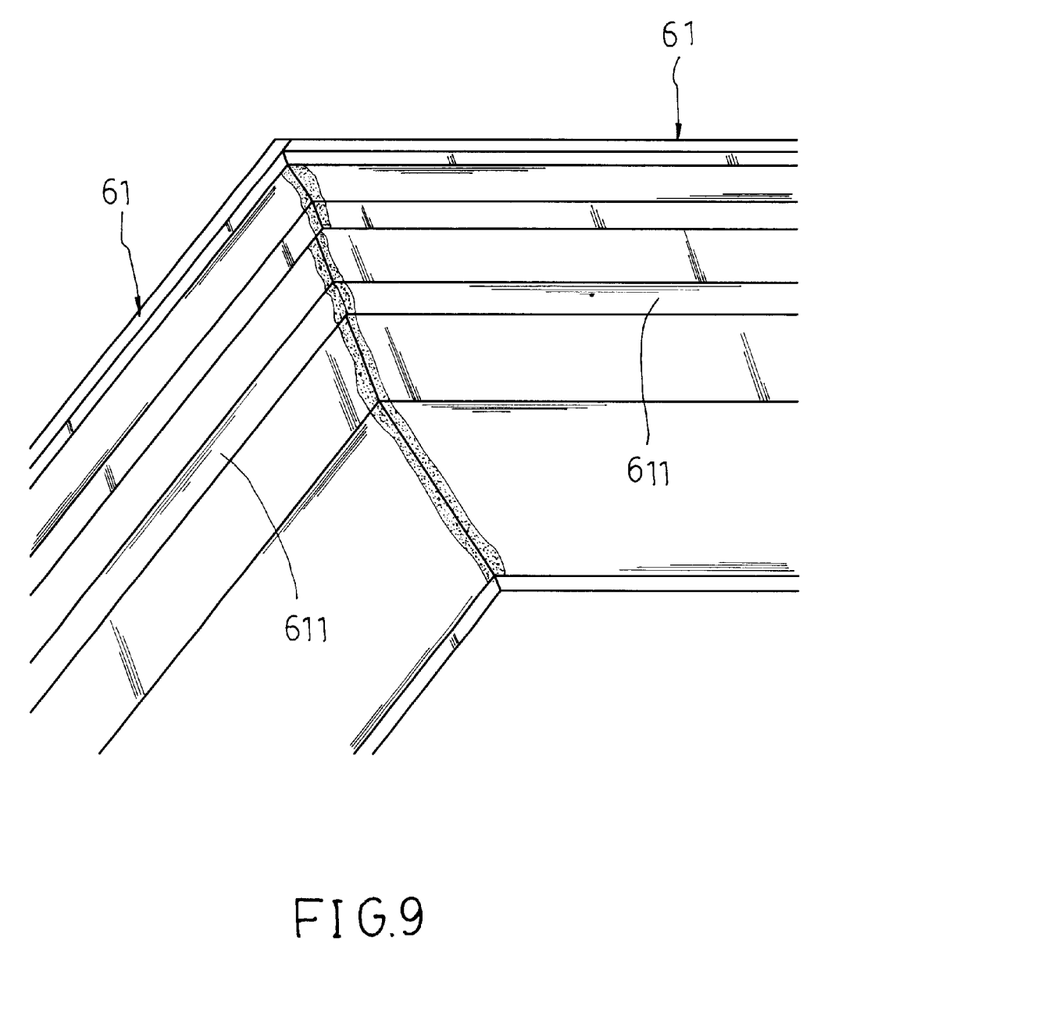
FIG. 9 shows an enlargement of a corner as shown at A point of FIG. 7.

Step 3—Stamping process, in which the front stile 61 and the rear stile 62 are placed on a stamping machine to punch out the keyboard bores 612 to contain the LCD control button or indication lamp exposure on the front stile 61 as shown in FIG. 6 and to cut off a slot 621 along the side of the rear stile 62 as shown in FIG. 8.

Figure 7:
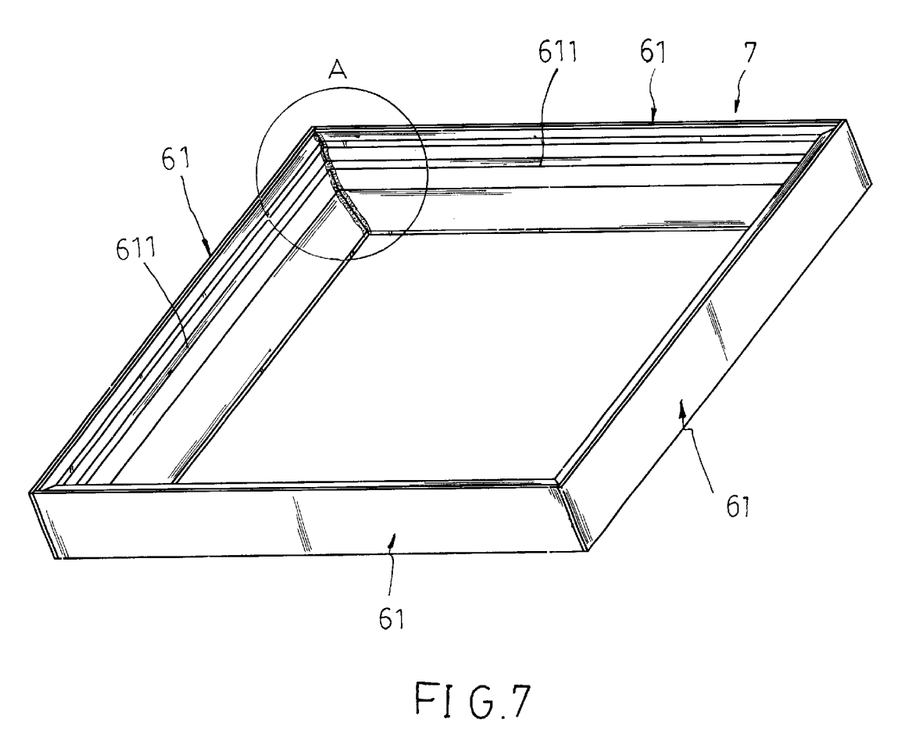
FIG. 7 shows a complete welded front sash with four pieces of a front stile.
Figure 11:
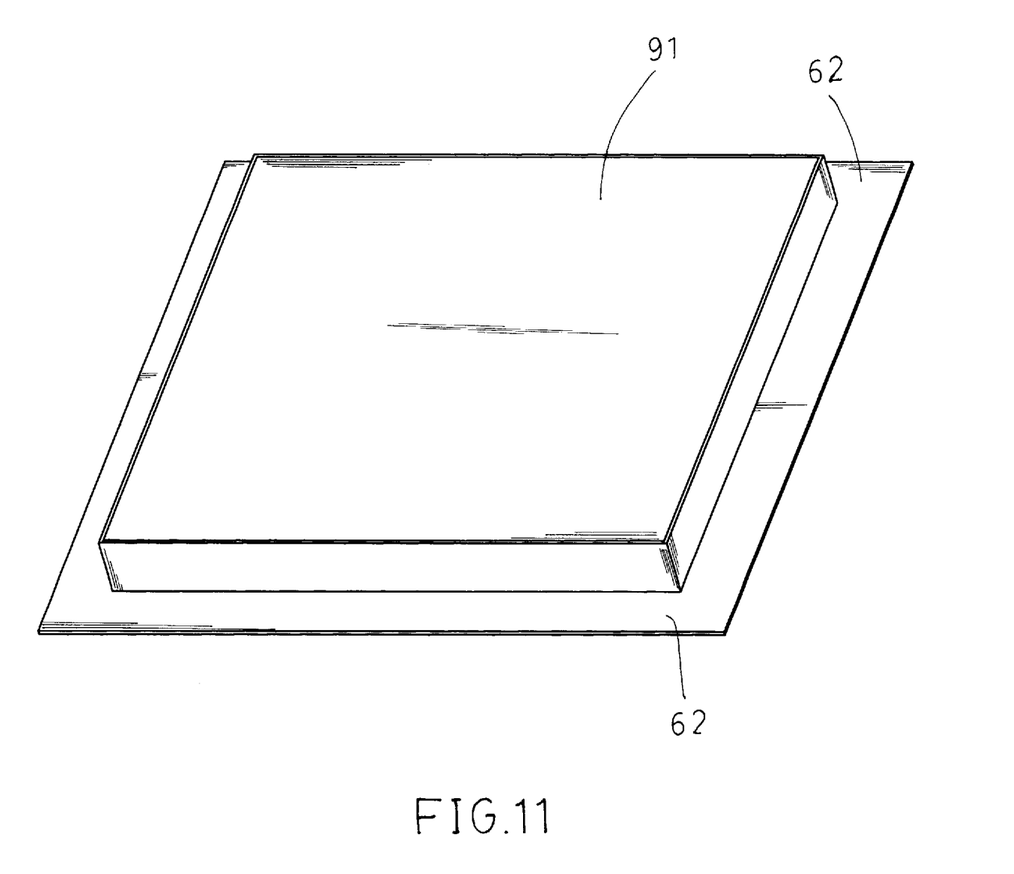
FIG. 11 shows a back view of a finished aluminum frame for LCD display of the invention.

Step 4—Frame welding, in which the beveled corners of each stile 61 and 62 are welded together by means of electric arc. In this way, no welding puncture will occur during the process. Four pieces of the front stile 61 or the rear stile 62 are welded firmly together to form the square front sash 7 as shown in FIG. 7 and so does the square rear sash 8 as shown in FIG. 8. Each transverse glazing rib of the front stile 61 is welded continuously and together to brace the strength of the front sash 7. The rear sash 8 is locked with the tie plate 90 for the purpose of reinforcement and the bottom plate 91 to seal the bottom face of the frame as shown in FIG. 11.

Step 5—Surface polishing and coating. The welding surfaces of the front sash 7 and the rear sash 8 are ground and polished with the sand wheels to obtain very smooth surfaces and then the whole sash is proceeded with the baking paint to secure a beautiful sash.

Figure 10:
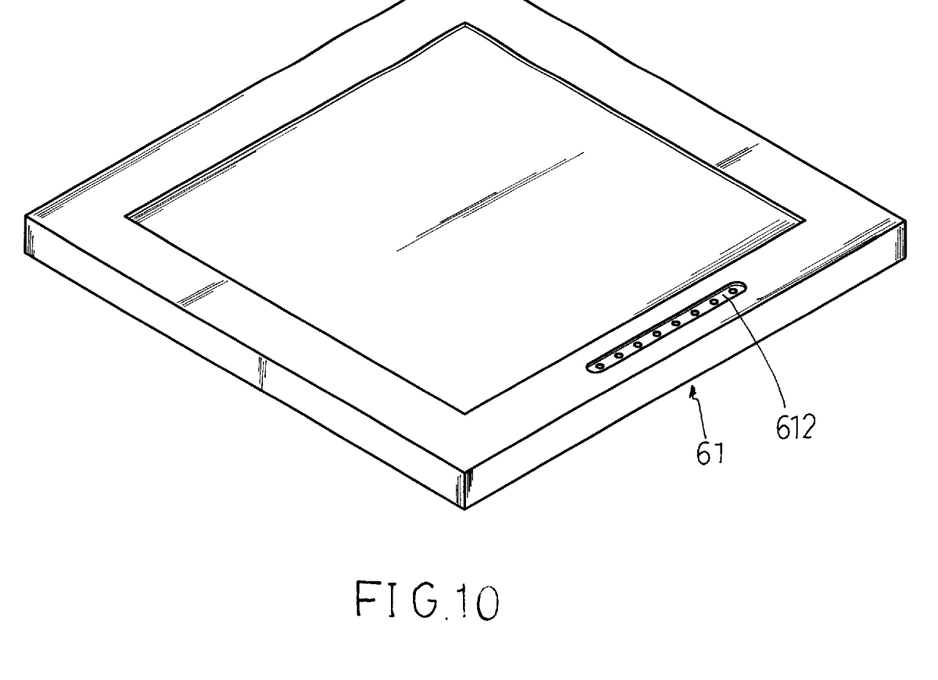
FIG. 10 shows a finished aluminum extruded outer frame for LCD display of the invention.

Place the front sash 7 over the rear sash 8, and insert the LCD panel, weld both sashes together to get a finished aluminum framed LCD panel as shown in FIG. 10. The aluminum framed LCD panel is light-weighted, beautiful and protective against EMI hazards. Compared with a prior art of the plastic LCD frame, the aluminum extruded outer frame of LCD display is light-weighted because it does not require reinforcement of metal plates; besides, it is suitable for recycling as the environment protection regulations require.

What is claimed is:

1. A method for manufacturing an aluminum extruded outer frame for LCD display, at least comprising the following steps:

stile extrusion and formation, with specified aluminum material extruded to form long stiles, such as front stiles and rear stiles, interior of said stiles stiffened with a transverse glazing rib;

diagonally beveling stile, with said front stiles and said rear stiles placed under a shearing machine to bevel diagonally a corner as specified for easy welding;

stamping process, with said front stile stamped a number of holes on one margin for use as a LCD control keyboard and said rear stiles cut a slot along an inner edge;

frame welding, with four pieces of stiles welded at a beveled corner by means of electric arc without generation of welding punctures to form square sashes, front sashes and rear sashes;

surface polishing and coating, with said front sashes and said rear sashes ground and polished at said welded surface to ensure a smooth surfaces and baked with paint to render them beautiful sashes and finally said front sashes placed over said rear sashes and LCD display inserted between to form an aluminum extruded outer frame with LCD display.

2. The aluminum frame for LCD display of claim 1, wherein each of said stiles is provided with said transverse glazing rib welded firmly with a neighboring glazing rib of the other stile so as to straighten the strength.

3. The aluminum frame for LCD display of claim 1, wherein a bottom of said rear sashes is welded with a tie plate as reinforcement and locked with an aluminum bottom plate to seal a slot so said aluminum extruded outer frame with LCD display has a flat bottom.

* * * * *